United States Patent [19]

Capellaro

[11] Patent Number: 5,421,289
[45] Date of Patent: Jun. 6, 1995

[54] FEED BOWL MOUNTING DEVICE FOR PET ENCLOSURES WITH SPRING LOADED DETENT PLUNGER FOR QUICK DISCONNECT AND REMOVAL OF THE BOWL

[76] Inventor: Ricky J. Capellaro, 8 Sega Dr., New Milford, Conn. 06776

[21] Appl. No.: 898,097

[22] Filed: Jun. 12, 1992

[51] Int. Cl.⁶ .............................................. A01K 39/00
[52] U.S. Cl. .................................... 119/18; 119/61; 119/72; 248/311.2
[58] Field of Search ..................... 119/18, 61, 63, 72; 248/230, 311.2, 318

[56] References Cited

U.S. PATENT DOCUMENTS

| | | | |
|---|---|---|---|
| 1,894,146 | 1/1933 | Baker | 248/311.2 |
| 2,075,739 | 3/1937 | McFarlane | 119/18 |
| 2,217,553 | 10/1940 | Huettenrauch | 248/311.2 |
| 2,334,590 | 11/1943 | Spiro, Jr. et al. | 119/18 |
| 2,471,527 | 5/1949 | Jonas | 119/18 |
| 2,514,491 | 7/1950 | Hay et al. | 119/18 |
| 2,931,334 | 4/1960 | Hammond | 119/18 |
| 3,361,116 | 1/1968 | Daniel et al. | 119/18 |
| 4,474,354 | 10/1984 | Field | 248/311.2 |

FOREIGN PATENT DOCUMENTS

| | | | |
|---|---|---|---|
| 588296 | 12/1959 | Canada | 119/72 |
| 2231978 | 1/1974 | Germany | 119/18 |
| 83250 | 11/1919 | Switzerland | 119/63 |

*Primary Examiner*—Gene Mancene
*Assistant Examiner*—Todd E. Manahan

[57] ABSTRACT

This invention provides a secure mount for pet enclosure feed bowls. The mounting structure or arm contains a vertically oriented receptacle hole which receives a shaft extending from the feed bowl. A step in the shaft sits on the surface of the mounting structure. Within the mounting structure is a detent comprised of a compression spring loaded pin, one end of the pin extending out of one end of the structure and terminating in a handle. The handle acts as a stop against the force of the compression spring orienting the other end of the pin into the receptacle hole impinging on the shaft to provide resistance to removal.

7 Claims, 2 Drawing Sheets

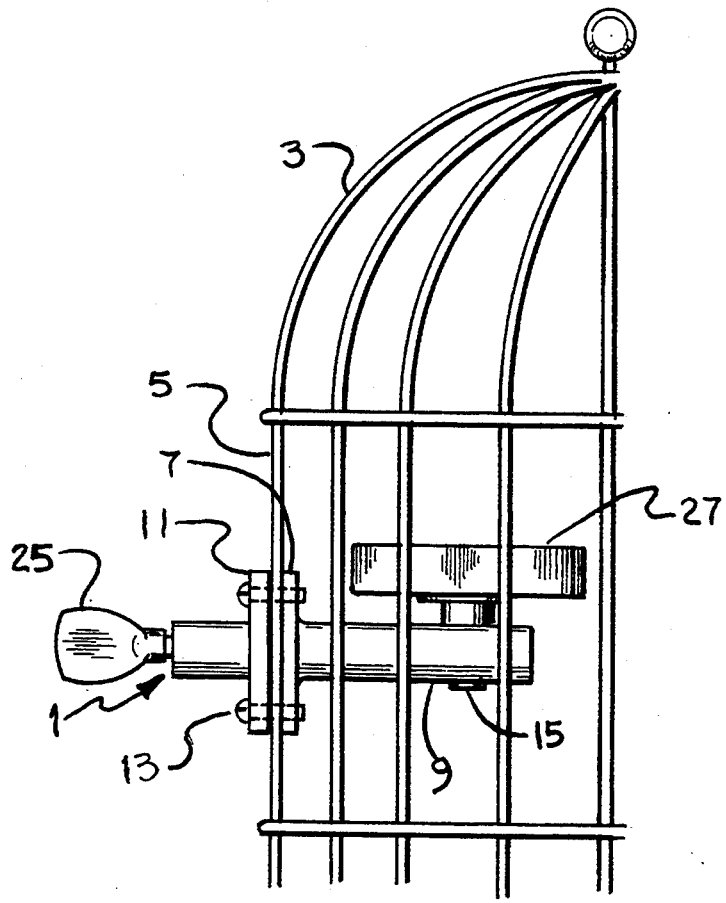
Fig_1
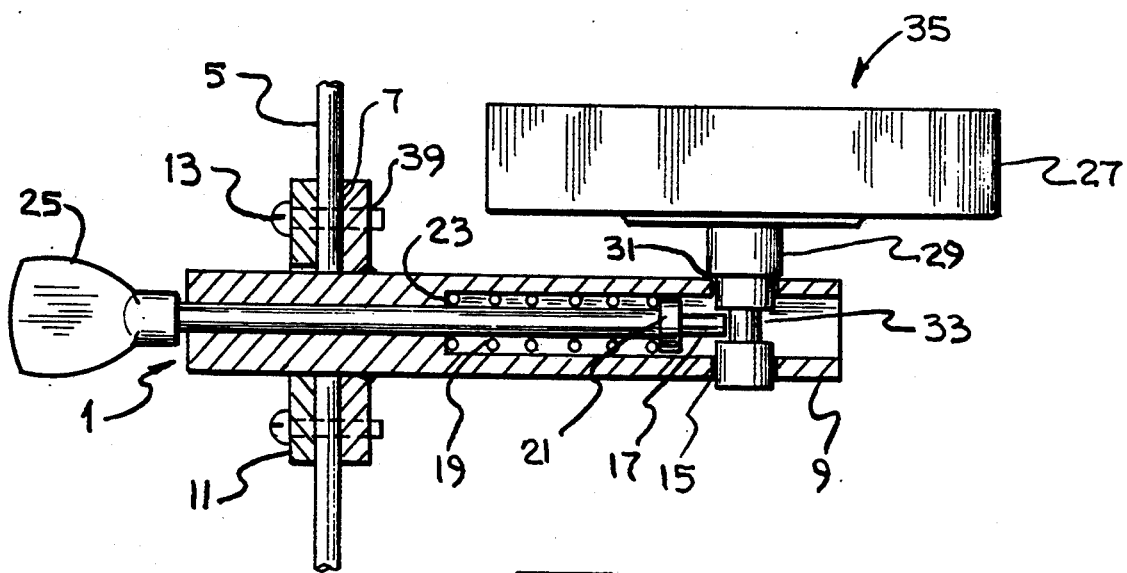
Fig_2

FEED BOWL MOUNTING DEVICE FOR PET ENCLOSURES WITH SPRING LOADED DETENT PLUNGER FOR QUICK DISCONNECT AND REMOVAL OF THE BOWL

SUMMARY OF THE INVENTION

Essential to the care of restrained animals such as birds, pets of various sizes and any domesticated animal keep in an enclosure is the requirement for refillable food and water containers located in such a way as to maintain sanitary conditions, avoid contamination and be securely mounted to avoid spillage.

Also desirable is the ability to both remove and replace the container for cleaning and refilling as rapidly as possible in order to minimize attendant time in the restraining enclosure thereby minimizing the emotional strain the intrusion may have on the animal. The disadvantage of quick removal and replaceable mechanisms is that even animals of limited intelligence can mimic the physical motions required to disconnect the retaining mechanism resulting in a cascade of contents onto the floor. What is needed is a quick disconnect and replacement device that required physical action complex enough to be beyond the animals competence; simple enough so it is actually used and secure enough against the animals frustrations so that contact by the animal won't disengage the device.

The subject invention NOT only meets all these requirements but provides in addition to them the ability to place the release control outside the enclosure so even a highly intelligent animal can not release the mechanism.

The Feed Bowl Mounting Device combines the container bowl with a shaft that fits into a vertical receptacle in a horizontal mounting arm. A spring loaded axial pin within the mounting arm latches into a groove or hole on the shaft, retaining the bowl shaft combination in place on the mounting arm. Mounting flanges suitable for the surface wall or post inside the enclosure complete the device. In application the attendant pulls against the spring loaded pin in a horizontal direction while at the same time lifting the bow-shaft combination in a vertical direction out of the receptacle. This simultaneous bi-directional movement is too complex for most animals. The device can be constructed so the mounting arm extends through the mounting surface to the exterior of the enclosure. The release mechanism will then be outside the enclosure. The release mechanism will then be outside the enclosure. The vertical shaft may be either a groove or one or more holes dispersed around the shaft to accept the horizontal spring loaded pin. A groove will permit the bowl-shaft combination to rotate about the vertical axis. Holes will fix the combination in one orientation.

DESCRIPTION OF DRAWINGS

FIG. 1 is a side view of the device mounted in a cage, with a partial view of the cage shown.

FIG. 2 is the device itself with the cross horizontal mounting arm in cross section.

DETAILED DESCRIPTION

Figure 3:
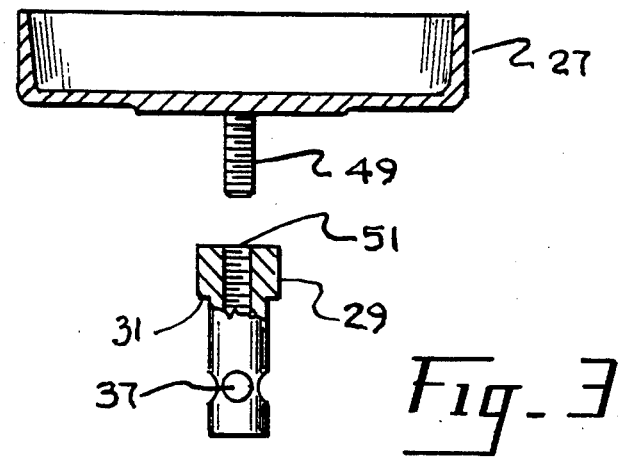
FIG. 3 shows the bowl in cross section disassembled from the shaft shown in partial cross section with a detent hole in the shaft.

Referring to FIG. 1, the device is mounted to the enclosure (3) side, in this instance the enclosure being a cage with vertical slabs or bars (5). A mounting flange (7) is affixed to the mounting arm (9) by suitable fastening means such as welding or by bracket and machine screws (not shown) into tapped holes (not shown). A matching mounting flange (11) is oriented on the outside of the enclosure (3) so that assembly hardware such as machine screws (13) into threaded mounting holes (39) may clamp the mounting flange (7) and matching flange (11) against the bars (5) securing the device (1) so that the mounting arm (9) is horizontal. At some point along the mounting arm (9) is a vertically oriented receptacle hole (15) perpendicular to the longitudinal axis of the mounting arm (9). Referring to the cross section FIG, (2); within the axial cavity of the mounting arm (9) is a pin (17) which is extended into the receptacle hole (15) by the pressure of a compression spring (19) against a projection (21) on the pin (17). The other end of the spring is retained by a step (23) in the cavity of the mounting arm. The pin (17) extends through the end of the mounting arm (9) and is terminated by a pull knob or ring handle means (25). The handle means (25) acts as a stop against the end of the mounting arm (9) so the pin (17), under pressure of the spring (19), extends a controlled distance into the receptacle hole (15).

Referring to FIG. 3, a container such as a feed or water bowl (27) is attached to a shaft (29). The lower portion of the shaft (29) is attached by suitable mechanical means such as a threaded extension (49) on the bottom of bowl (27) threaded into a matching receptacle (51) in the shaft (29). The lower portion of the shaft is dimensioned to fit into the receptacle hole (15) and its upper portion has a step (31) increasing its dimension larger than that of the receptacle hole (15). In the lower portion of the shaft (29) is a radial groove (33) slightly wider than the diameter of the pin (17) so that when the shaft (29) is inserted into the receptacle hole (15) the step (31) seats on the surface of the mounting arm orienting the centerline of the groove (33) on the same plane as the centerline of the pin (17). The depth of the groove (33) is sufficient to allow the extension of the pin (17) into the receptacle hole (15) to both interfere with the wall of the groove (33) and press against the inner diameter of the groove (33) by the pressure of the spring (19). The assembly (35) of the bowl (27), and shaft (29) is held securely into the mounting arm (9) against horizontal forces by the walls of the receptacle hole (15) and the pressure of pin (17) against the shaft (29). The bowl-shaft assembly (35) is held securely against downward vertical pressure by the step (31) and against upward pressure by the pin (17) interfering with the wall of the groove (33). To remove the bowl shaft assembly (35) the attendant need only pull on the handle means (25) withdrawing the pin (17) from the groove (33) and lift the assembly (35) from the receptacle hole (15).

In the preferred embodiment of the invention as shown in FIGS. 1 and 2 the groove (33) offers little resistance to rotation of the assembly (35) about the axis of the shaft (29). If the application requires that there be no rotation or that there be a specific orientation of the bowl (27), referring to FIG. 3, one or more detent holes (37), with diameter large enough to accept pin (17), are located in place of and on the center-line of groove (33)

described above. Not shown is a combination of this feature with the detent holes (37) actually in the groove (33).

Figure 5:
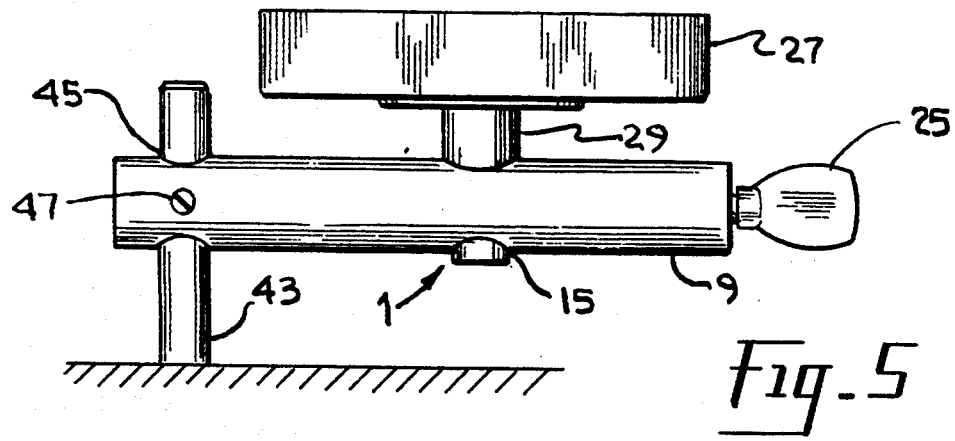
FIG. 5 shows the mounting arm connected to a feed bowl post.

Referring to FIG. 5, a standard means of mounting feed containers in bird cages is to clamp the container to a vertical feed bowl post (43). The device (1) for this type of application has a mounting hole (45) near the end of the mounting arm (9) opposite the handle means (25). The mounting hole (45) is dimensioned to fit over the feed bowl post (43) the axis of which is oriented in the same pane as the receptacle hole (15). Perpendicular to this mounting hole is a locking set screw (47) set into the center of horizontal arm and coincident to the center line of the mounting hole (45). The set screw (47), when tightened, protrudes into the mounting hole (45). The device is mounted in this type of cage by placing the mounting hole (45) over the post (43) and tightening the locking set screw (47) firmly against the post (43).

The materials and dimensions of the elements of this device (1) are selected as might be appropriate for rigidity, size of the enclosure (3) and size of thee bowl (27).

Figure 4:
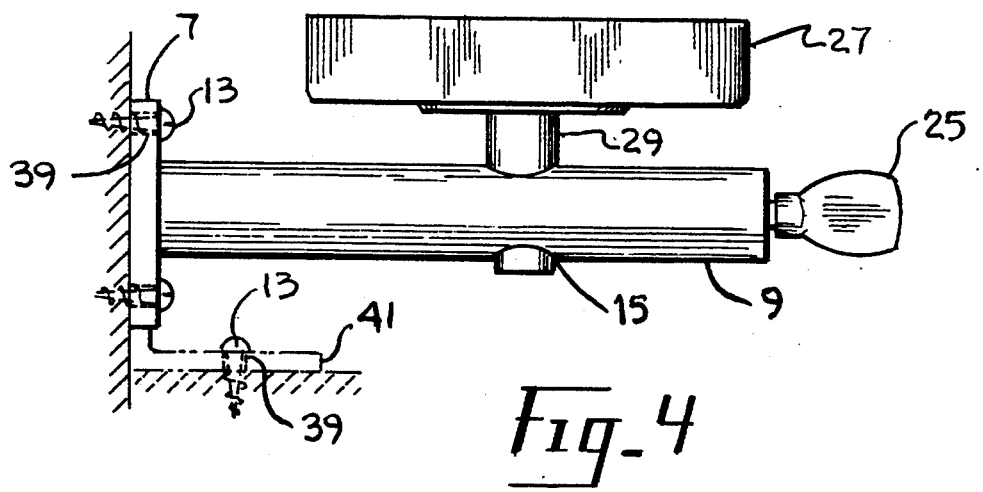
FIG. 4 is a side view of the device mounted to a solid wall with alternate mounting means to a floor shown in phantom.

Referring to FIG. 4, an alternative mounting flange (41) can be affixed to the end of the arm (9) to mount the arm (9) to a horizontal solid surface or the mounting flange (7) shown in FIGS. 1, 2 and 4 can be used to mount the arm (9) to a vertical solid surface using mounting hardware (13) through the mounting holes (39).

I claim:

1. A feed bowl mounting device to be placed in an enclosure comprised of a feed bowl with a shaft attached perpendicularly thereto and descending below the feed bowl, an elongated mounting arm having a central longitudinal axis and containing an axial cavity, a receptacle hole extending through said mounting arm perpendicular to the mounting arm axial cavity, said receptacle hole being dimensioned to accept the shaft, a mounting means affixed to one end of the mounting arm to mount the device to surfaces of an enclosure and orient the mounting arm in a horizontal plane with the receptacle hole axis in a vertical plane, and detent means within the mounting arm axial cavity to secure the shaft in the receptacle hole when the shaft is inserted into the receptacle hole.

2. The feed bowl mounting device of claim 1, wherein the detent means within the mounting arm axial cavity is comprised of a pin extending along the axis of the mounting arm cavity into the receptacle hole, a compression spring means contained within the mounting arm axial cavity captivated between a projection on the pin and one end of the mounting arm axial cavity; wherein an end of the pin extends through an opening in the end of the mounting arm cavity which captivates the compression spring means and terminates in a handle affixed to the pin, the handle being larger than the mounting arm axial cavity opening thereby acting as a stop against the pressure of the compression spring means on the pin; the length of the pin determining the extension of the pin into the receptacle hole; the compression spring means being dimensioned so that axial pressure on the handle against the compression spring means allows the pin to be withdrawn completely from the receptacle hole; the shaft extending from the feed bowl being of sufficient length to extend into the receptacle hole past the central longitudinal axis of the mounting arm so that when pressure against the handle is released, the compression spring means forces the pin against the shaft with sufficient pressure to resist withdrawal of the shaft from the receptacle hole by the force of friction.

3. The feed bowl mounting device of claim 2, wherein the mounting means is positioned between the handle and the receptacle hole thereby orienting the device on the surface of the enclosure so that the handle is on the opposite side of the enclosure from the receptacle hole containing the feed bowl and shaft.

4. The feed bowl mounting device of claim 2, wherein said detent means further is comprised of a radial groove cut into the shaft of sufficient width and depth to accept the pin and wherein the handle on the pin is dimensioned to allow the compression spring means to extend the pin into the groove providing a positive interference of the pin against the wall of the groove in resistance to vertical movement of the shaft when the handle means is released, the center of the groove being in the same plane as the axis of the pin.

5. The feed bowl mounting device of claim 4, wherein the shaft has a cross section just beneath the bowl, which is sufficiently larger than the receptacle hole, and the shaft stepping down to a smaller cross section permit insertion of the shaft into the receptacle hole so that the step of the larger cross section seats on the surface of the mounting arm, said groove being located on the section of the shaft such that upon insertion of the shaft into the receptacle hole orients the groove in line with the pin.

6. The feed bowl mounting device of claim 2, wherein said detent means is further comprised of at least one radial hole drilled partially into the shaft, each hole being of sufficient diameter to accept the pin and so placed on the shaft so that the pin can be inserted into a hole thereby prohibiting rotation of the shaft.

7. The feed bowl mounting device of claim 2, where the mounting means is a post hole extending through the mounting arm at the opposite end of the mounting arm from the handle, the post hole being dimensioned to slip over a standard vertical bird cage feed post, the mounting arm having a locking set screw perpendicular to the post hole so that the set screw, when tightened, impinges on the feed post, thereby securing the mounting arm in a horizontal orientation, with the receptacle hole in a vertical orientation.

* * * * *